US012617886B2

(12) United States Patent
Gerard

(10) Patent No.: US 12,617,886 B2
(45) Date of Patent: May 5, 2026

(54) LIQUID COMPOSITION COMPRISING A WAX COMPOUND, ITS PROCESS OF POLYMERIZATION, USE AND MATERIAL OR COMPOSITION OBTAINED FOLLOWING POLYMERIZATION OF COMPOSITION

(71) Applicant: Arkema France, Colombes (FR)

(72) Inventor: Pierre Gerard, Lacq (FR)

(73) Assignee: ARKEMA FRANCE, Puteaux (FR)

( * ) Notice: Subject to any disclaimer, the term of this patent is extended or adjusted under 35 U.S.C. 154(b) by 636 days.

(21) Appl. No.: 17/438,133

(22) PCT Filed: Mar. 11, 2020

(86) PCT No.: PCT/EP2020/056532
§ 371 (c)(1),
(2) Date: Sep. 10, 2021

(87) PCT Pub. No.: WO2020/182899
PCT Pub. Date: Sep. 17, 2020

(65) Prior Publication Data
US 2022/0162365 A1    May 26, 2022

(30) Foreign Application Priority Data
Mar. 11, 2019    (FR) ...................................... 1902460

(51) Int. Cl.
*C08F 265/06*    (2006.01)
*C08J 5/24*    (2006.01)
*C08L 91/06*    (2006.01)
*D06M 15/263*    (2006.01)

(52) U.S. Cl.
CPC ............. *C08F 265/06* (2013.01); *C08J 5/249* (2021.05); *C08L 91/06* (2013.01); *D06M 15/263* (2013.01)

(58) Field of Classification Search
None
See application file for complete search history.

(56) References Cited

U.S. PATENT DOCUMENTS 3,637,559 A * 1/1972 Pinkney ................ C08F 265/06
                                                              525/308
4,145,477 A    3/1979 Smiley 2005/0004283 A1*    1/2005  Lindemann ................ C09J 4/06
                                                                    524/556
2008/0286218 A1*   11/2008  Giroud ..................... A61K 8/91
                                                                    424/70.13
2015/0191622 A1     7/2015  Zhao et al.
2017/0009033 A1*    1/2017  Gerard .................... B29C 45/02
2020/0010639 A1     1/2020  Gerard et al.

FOREIGN PATENT DOCUMENTS

| EP | 1927603 A1 | 6/2008 |
| FR | 3060577 A1 | 6/2018 |
| JP | H09177333 A | 7/1997 |
| JP | 2001164152 A | 6/2001 |
| JP | 2002220553 A | 8/2002 |
| JP | 2007-224264 A | 9/2007 |
| JP | 2012-246452 A | 12/2012 |
| WO | 2013056845 A2 | 4/2013 |
| WO | 2014013028 A1 | 1/2014 |
| WO | 2015110534 A1 | 7/2015 |

OTHER PUBLICATIONS

Bolon, D.A., et al., "Barrier Coats Versus Inert Atmospheres. The Elimination of Oxygen Inhibition in Free-Radical Polymerizations", Journal of Applied Polymer Science, Sep. 1, 1978, pp. 2543-2551, vol. 22, John Wiley & Sons, Inc. (9 pages).
International Search Report (PCT/ISA/210) and Written Opinion (PCT/ISA/237) mailed on May 14, 2020, by the European Patent Office as the International Searching Authority for International Application No. PCT/EP2020/056532. (16 pages).
Schroeter, S.H., et al., "Evaporation Control of Monomers From Solventless Resin Compositions", Radiation Physics Chemistry, Jan. 1, 1979, pp. 869-882, vol. 14, No. 3-6, Pergamon Press Ltd., Great Britain. (14 pages).

* cited by examiner

*Primary Examiner* — Shawn Mckinnon
(74) *Attorney, Agent, or Firm* — BUCHANAN INGERSOLL & ROONEY PC

(57)    ABSTRACT

A liquid composition including a monomer, a (meth)acrylic polymer and a wax compound. The liquid composition can be used as a syrup and especially as a syrup for impregnation of fibres or fibrous material. Also, a thermoplastic material obtained after polymerization of the liquid composition. Also, a process for manufacturing such a liquid composition. Also, a process for impregnating a fibrous substrate of long or continuous fibres with such a liquid composition. Also, a fibrous substrate impregnated with such a liquid composition which is useful for manufacturing composite parts. Also, a process for manufacturing mechanical parts or structural elements made of composite material and mechanical parts or structural elements made of composite material obtained via a process using such a liquid composition.

23 Claims, No Drawings

LIQUID COMPOSITION COMPRISING A WAX COMPOUND, ITS PROCESS OF POLYMERIZATION, USE AND MATERIAL OR COMPOSITION OBTAINED FOLLOWING POLYMERIZATION OF COMPOSITION

FIELD OF THE INVENTION

The present invention relates to a liquid composition comprising a monomer, a (meth)acrylic polymer and at a wax compound.

In particular the present invention relates to a liquid composition comprising a monomer, a (meth)acrylic polymer and a wax compound. That liquid composition can be used as a syrup and especially as a syrup for impregnation of fibres or fibrous material. Also concerned is a thermoplastic material obtained after polymerization of the liquid composition. The invention also relates to a process for manufacturing such a liquid composition. The invention also relates to a process for impregnating a fibrous substrate of long or continuous fibres with said liquid composition. The invention also relates to a fibrous substrate impregnated with said liquid composition which is useful for manufacturing composite parts.

The present invention also relates to a process for manufacturing mechanical parts or structural elements made of composite material and to mechanical parts or structural elements made of composite material obtained via a process using such a liquid composition.

PRIOR ART

Thermoplastic polymers are materials that are widely used today in several fields and applications, for example in the construction, aeronautic, automobile or railway sectors, where they are part of mechanical parts.

These mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics, and sports notably due to their better mechanical performance (higher tensile strength, higher tensile modulus, higher fracture toughness) and their low density, in comparison with homogeneous materials.

To allow thermoforming and recycling, it is preferred to use thermoplastic polymers also in composite materials, contrary to thermoset polymers.

Thermoplastic polymers consist of linear or branched polymers, which are usually not crosslinked. The thermoplastic polymers are heated in order to mix the constituents necessary for manufacturing the composite material and are cooled to set the final form. The problem of these molten thermoplastic polymers is their very high viscosity in the molten state in order to homogenously impregnating for example a fibrous substrate. The wetting or correct impregnation of the fibers by the thermoplastic polymer can only be achieved, if the thermoplastic resin is sufficiently fluid. In order to have a low viscosity or sufficient fluidity of the thermoplastic polymer the chain length or molecular mass shall be reduced. However a too low molecular weight has a negative impact on the performance of the composite material and on the mechanical or structured parts especially their mechanical properties as the deformation modulus.

In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymeric syrup constitutes the matrix of the composite material.

Another way to reduce the viscosity in an important way of the thermoplastic polymer is to increase the temperature. Consequently the continuous working temperature is relatively high, above 200° C., increasing the economics costs of the composite material and mechanical or structured parts due to implication of high energy costs. Additionally thermoplastic polymers tend to degrade if the temperature is too high, which is especially true for semicrystalline thermoplastic polymers that have high melting points as for example polyamides such as PA6.6, polyethersulfon (PES), polyetherimid (PEI), polyetheretherketon (PEEK) or polyphenylene sulfide (PPS). This thermoinduced degradation yields to a decreasing molecular weight of the polymer matrix on the fibrous substrate important for the cohesion of the composite material and the mechanical or structured parts.

Another way for impregnating the fibrous substrate is to dissolve the thermoplastic polymer in an organic solvent. However this method requires a lot of solvent that has to be evaporated. There are environmental issues in using large quantities of solvent in term of energy and pollution.

Still another way is for impregnating the fibrous substrate is to use the respective monomers for the impregnation and polymerize to form the thermoplastic polymer after the impregnation. However this method usually uses monomers that might evaporate partly or have an unpleasant smell. This is especially a problem, where the impregnation is made with contact to the environment or air in an open impregnation process. Additionally there is also an environmental issue in using certain monomers in an open environment.

At the time of impregnation, when preparing polymeric composites, the viscosity of the impregnation syrup must be controlled and adapted so as not to be too fluid or too viscous, so as to impregnate correctly each fibre of the fibrous substrate. When the wetting is partial, depending on whether the syrup is too fluid or too viscous, "naked" zones, i.e. non-impregnated zones, and zones in which drops of polymer form on the fibres, which are the cause of the creation of bubbles, respectively appear. These "naked" zones and these bubbles give rise to the appearance of defects in the final composite material, which are the cause, inter alia, of a loss of mechanical strength of the final composite material. Also the evaporation of monomer has an influence on the viscosity.

One objective of the present invention is to propose a liquid composition comprising (meth)acrylic monomers, that a reduced evaporation of (meth)acrylic monomers.

A liquid composition or syrup comprising a (meth)acrylic monomer and a (meth)acrylic polymer is described in WO 2013/056845 and WO 2014/013028. For both documents no wax compound is used and when the compositions are used in open molds or in the open, a part of the (meth)acrylic monomer evaporates and changes the weight rations in the composition and also the viscosity.

The document WO2015/110534 discloses a liquid (meth) acrylic syrup. The syrup comprises specific (meth)acrylic monomers with a high boiling point and a low vapour pressure for avoiding their evaporation. The impregnation process requires these specific monomers, that might be more expensive, and reduces the choice of the monomers in the process.

It is not suggested in any of these documents that an incorporation of a wax compound, into a liquid composition reduces significantly the evaporation of the monomer.

Technical Problem

The aim of the invention is thus to remedy at least one of the drawbacks of the prior art.

One objective of the present invention is to propose a liquid composition comprising (meth)acrylic monomers, that has a reduced evaporation of (meth)acrylic monomers. By reduced evaporation is understood that less than 20 wt % of the (meth)acrylic monomers evaporates, preferably less than 10 wt %, even more preferably less than 5 wt % and advantageously less than 2 wt %. The evaporation is looked at, at 23° C. for a duration of 20 minutes.

An objective of the present invention is also to have a liquid composition comprising a (meth)acrylic monomer, a (meth)acrylic polymer, that has a reduced evaporation of (meth)acrylic monomer and that can be polymerized fast and to a good conversion. By a good conversion is understood that at least 95% of the monomers have been polymerized.

Another objective of the present invention is also to have a process for polymerizing a liquid composition comprising a (meth)acrylic monomer, a (meth)acrylic polymer to a good conversion while having a reduced evaporation of the (meth) acrylic monomer.

Still another objective of the present invention is to use a liquid composition comprising a (meth)acrylic monomer, a (meth)acrylic polymer for impregnating a fibrous substrate and having a reduced evaporation of the (meth)acrylic monomer.

BRIEF DESCRIPTION OF THE INVENTION

It has been discovered, surprisingly, that a liquid composition LC1 comprising
   a) a (meth)acrylic polymer (P1),
   b) a (meth)acrylic monomer (M1), and
   c) a wax compound (W);
said liquid composition LC1 is having a dynamic viscosity of between 10 mPa*s and 10 000 mPa*s at 25° C., yields to a liquid composition having reduced evaporation of the (meth)acrylic monomer (M1), in comparison to a composition comprising no wax compound (W).

It has also been discovered that a liquid composition LC1 comprising
   a) a (meth)acrylic polymer (P1),
   b) a (meth)acrylic monomer (M1), and
   c) a wax compound (W);
said liquid composition LC1 is having a dynamic viscosity of between 10 mPa*s and 10 000 mPa*s at 25° C., can be used to produce a thermoplastic composite polymer composition after polymerization of said (meth)acrylic monomer (M1), said thermoplastic polymer composition is having a good conversion.

It has been discovered as well that a liquid composition LC1 or a liquid (meth)acrylic composition LC1 for impregnating a fibrous substrate, said fibrous substrate consisting of long or continuous fibres, said composition being characterized in that it comprises:

a) a (meth)acrylic polymer (P1),
   b) a (meth)acrylic monomer (M1), and
   c) a wax compound (W);
said liquid composition LC1 or liquid (meth)acrylic syrup having a dynamic viscosity of between 10 mPa*s and 10 000 mPa*s at 25° C.; can be used as liquid composition for impregnation having reduced evaporation of the (meth) acrylic monomer (M1), in comparison to a composition comprising no wax compound (W).

It has also been discovered, surprisingly, that a process for impregnation a fibrous substrate, comprising the following steps:
   i) impregnating a fibrous substrate with such a liquid composition LC1 or (meth)acrylic syrup comprising
      a) a (meth)acrylic polymer (P1),
      b) a (meth)acrylic monomer (M1), and
      c) a wax compound (W);
makes it possible to obtain an impregnated fibrous substrate with reduced evaporation of the (meth)acrylic monomer (M1), in comparison to a composition comprising no wax compound (W).

It has also been discovered, surprisingly, that a process for manufacturing composite parts, comprising the following steps:
   i) impregnating a fibrous substrate with such a liquid composition LC1 or (meth)acrylic syrup comprising
      a) a (meth)acrylic polymer (P1),
      b) a (meth)acrylic monomer (M1), and
      c) a wax compound (W);
   ii) polymerizing
makes it possible to obtain an impregnated fibrous substrate with reduced evaporation of the (meth)acrylic monomer (M1), in comparison to a composition comprising no wax compound (W).

DETAILED DESCRIPTION

According to a first aspect, the present invention relates to a liquid composition LC1 comprising:
   a) a (meth)acrylic polymer (P1),
   b) a (meth)acrylic monomer (M1), and
   c) a wax compound (W);
said liquid composition LC1 is having a dynamic viscosity of between 10 mPa*s and 10 000 mPa*s at 25° C.

According to a second aspect, the present invention relates to a liquid composition LC1 for impregnating a fibrous substrate, said fibrous substrate consisting of long fibres, and said liquid composition LC1 being characterized in that it comprises:
   a) a (meth)acrylic polymer (P1),
   b) a (meth)acrylic monomer (M1), and
   c) a wax compound (W);
said liquid composition LC1 or liquid (meth)acrylic syrup having a dynamic viscosity of between 10 mPa*s and 10 000 mPa*s at 25° C.

According to a third aspect, the present invention relates to process for preparing a liquid composition LC1, said liquid composition LC1 is being characterized in that it comprises:
   a) a (meth)acrylic polymer (P1),
   b) a (meth)acrylic monomer (M1), and
   c) a wax compound (W);
said liquid composition LC1 or liquid (meth)acrylic syrup having a dynamic viscosity of between 10 mPa*s and 10 000 mPa*s at 25° C., is prepared by a process comprising the following steps:
   i) preparing a liquid mixture of (meth)acrylic polymer (P1) and (meth)acrylic monomer (M1)

ii) adding a wax compound (W) to the mixture prepared in the previous step.

According to a fourth aspect, the present invention relates to the use of a liquid composition LC1 for impregnating a fibrous substrate, said fibrous substrate consisting of long fibres, and said liquid composition LC1 being characterized in that it comprises:

a) a (meth)acrylic polymer (P1), b) a (meth)acrylic monomer (M1), and c) a wax compound (W);

said liquid composition LC1 or liquid (meth)acrylic syrup having a dynamic viscosity of between 10 mPa*s and 10 000 mPa*s at 25° C.

According to a fifth aspect, the present invention relates to the use of a liquid composition LC1 for manufacturing thermoplastic parts or manufacturing composite parts, and said liquid composition LC1 being characterized in that it comprises:

a) a (meth)acrylic polymer (P1), b) a (meth)acrylic monomer (M1), and c) a wax compound (W);

said liquid composition LC1 or liquid (meth)acrylic syrup having a dynamic viscosity of between 10 mPa*s and 10 000 mPa*s at 25° C.

According to a sixth aspect, the present invention relates to process for manufacturing thermoplastic composite parts by a process comprising the following steps:

i) preparing a liquid mixture of (meth)acrylic polymer (P1) and (meth)acrylic monomer (M1), ii) adding a wax compound (W) to the mixture prepared in previous step, iii) putting the liquid (meth)acrylic composition or liquid composition LC 1 prepared in i) and ii) in means for polymerization, said composition is being characterized in that it comprises:

a) a (meth)acrylic polymer (P1), b) a (meth)acrylic monomer (M1), c) a wax compound (W) and d) a initiator (Ini);

said liquid composition LC1 or liquid (meth)acrylic syrup having a dynamic viscosity of between 10 mPa*s and 10 000 mPa*s at 25° C., iv) polymerizing.

According to a seventh aspect, the present invention relates to process for manufacturing composite parts by a process comprising the following steps:

i) preparing a mixture of (meth)acrylic polymer (P1) and (meth)acrylic monomer (M1) and a wax compound (W), ii) adding initiator (Ini) to the mixture prepared in previous step, iii) impregnating fibres or fibrous substrate with the liquid (meth)acrylic composition or liquid composition LC1 prepared in i) and ii), said composition is being characterized in that it comprises:

a) a (meth)acrylic polymer (P1), b) a (meth)acrylic monomer (M1), c) a wax compound (W) and d) a initiator (Ini));

said liquid (meth)acrylic syrup or liquid composition LC1 having a dynamic viscosity of between 10 mPa*s and 10 000 mPa*s at 25° C., iv) polymerizing.

The term "fibrous substrate" as used refers to several fibres, uni directional rovings or continuous filament mat, fabrics, felts or nonwovens that may be in the form of strips, laps, braids, locks or pieces.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70 wt % for the MMA copolymer.

The term "monomer" as used refers to a molecule that can undergo polymerization.

The term "polymerization" as used refers to the process of converting a monomer or a mixture of monomers into a polymer.

The term "thermoplastic polymer" as used refers to a polymer that turns to a liquid or becomes more liquid or less viscous of soft when heated and that can take on new shapes by the application of heat and pressure. This applies also for slightly crosslinked thermoplastic polymers that can be thermoformed when heated above the softening temperature.

The term "polymer composite" as used refers to a multicomponent material comprising several different phase domains, among which at least one type of phase domain is a continuous phase and in which at least one component is a polymer.

The term "initiator" as used refers to a compound that can start/initiate the polymerization of a monomer or monomers.

By the abbreviation "phr" is meant weight parts per hundred parts of composition. For example 1 phr of compound in the composition means that 1 kg of that compound is added to 100 kg of composition.

By the abbreviation "ppm" is meant weight parts per million parts of composition. For example 1000 ppm of a compound in the composition means that 0.1 kg of compound is present in 100 kg of composition.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The liquid composition LC1 or liquid (meth)acrylic syrup according to the invention comprises a (meth)acrylic monomer (M1) or a mixture of (meth)acrylic monomers (M1) and (M1+x), a (meth)acrylic polymer (P1) and a wax compound (W). The wording "liquid composition LC1" or "liquid (meth)acrylic syrup" or "(meth)acrylic syrup" or "liquid (meth)acrylic composition" are used as synonyms throughout this text, said composition or syrup is comprising at least the three essential compounds a) a (meth)acrylic polymer (P1), b) a (meth)acrylic monomer (M1) and c) a wax compound (W)

The dynamic viscosity of the liquid composition LC1 or (meth) acrylic syrup is in a range from 10 mPa*s to 10000 mPa*s, preferably from 20 mPa*s to 7000 mPa*s and advantageously from 20 mPa*s to 5000 mPa*s and more advantageously from 20 mPa*s to 2000 mPa*s and even more advantageously between 20 mPa*s and 1000 mPa*s and even still more advantageously between 25 mPa*s and 1000 mPa*s and most advantageously between 30 mPa*s and 1000 mPa*s. The viscosity of the syrup can be easily measured with a Rheometer or viscosimeter. The dynamic viscosity is measured at 25° C. If the liquid (meth)acrylic syrup has a Newtonian behaviour, meaning no shear thinning, the dynamic viscosity is independent of the shearing in a rheometer or the speed of the mobile in a viscometer. If the liquid composition has a non-Newtonian behaviour, meaning shear thinning, the dynamic viscosity is measured at a shear rate of 1 s$^{-1}$ at 25° C.

The liquid composition LC1 or (meth)acrylic syrup according to the invention, for impregnating the fibrous substrate, especially comprises a (meth)acrylic monomer (M1) or a mixture of (meth)acrylic monomers, a (meth) acrylic polymer (P1) and a wax compound (W).

The quantity of the wax compound (W) in the liquid composition LC1 is at least 0.1 phr relative to the sum of (meth)acrylic monomer (M1) and (meth)acrylic polymer (P1). Preferably the quantity of wax compound (W) in the composition is at least 0.15 phr, more preferably at least 0.2 phr, even more preferably at least 0.25 phr and advantageously at least 0.3 phr, and more advantageously at least 0.4 phr, and still more advantageously at least 0.5 phr and even still more advantageously at least 0.55 phr and most advantageously at least 0.59 phr relative to the sum of (meth) acrylic monomer (M1) and (meth)acrylic polymer (P1).

The quantity of the wax compound (W) in the composition is at most 2 phr relative to the sum of (meth)acrylic monomer (M1) and (meth)acrylic polymer (P1). Preferably the quantity of the wax compound (W) in the composition is at most 1.8 phr, more preferably at most 1.5 phr, even more preferably at most 1.3 phr and advantageously at most 1.2 phr relative to the sum of (meth)acrylic monomer (M1) and (meth)acrylic polymer (P1).

Preferably the quantity of the wax compound (W) in the liquid composition LC1 is between 0.1 phr and 2 phr relative to the sum of (meth)acrylic monomer (M1) and (meth) acrylic polymer (P1).

More preferably quantity of the wax compound (W) in the liquid composition LC1 is between 0.15 phr and 1.9 phr, even more preferably between 0.2 phr and 1.8 phr, still more preferably between 0.25 phr and 1.7 phr, advantageously between 0.3 phr and 1.6 phr, more advantageously between 0.4 phr and 1.5 phr, even more advantageously between 0.45 phr and 1.4 phr and still more advantageously between 0.5 phr and 1.3 phr and even still more advantageously between 0.55 phr and 1.3 phr most more advantageously between 0.59 phr and 1.3 phr relative to the sum of (meth)acrylic monomer (M1) and (meth)acrylic polymer (P1).

As regards the liquid composition LC1 of the invention it comprises a (meth)acrylic monomer (M1), a (meth)acrylic polymer (P1) and a wax compound (W). Once polymerized the (meth)acrylic monomer (M1) is transformed to a (meth) acrylic polymer (P2) comprising the monomeric units of (meth)acrylic monomer (M1). In a variation, a mixture of (meth)acrylic monomers once polymerized is transformed to a (meth)acrylic copolymer comprising the monomeric units of the respective (meth)acrylic monomers.

As regards the (meth)acrylic monomer (M1), the monomer is chosen from acrylic acid, methacrylic acid, alkyl acrylic monomers, alkyl methacrylic monomers, hydroxyalkyl acrylic monomers and hydroxyalkyl methacrylic monomers, and mixtures thereof.

Preferably, the (meth)acrylic monomer (M1) is chosen from acrylic acid, methacrylic acid, hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer (M1) is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

According to a preferred embodiment, at least 50% by weight and preferably at least 60% by weight of the (meth) acrylic monomer (M1) is methyl methacrylate.

According to a first more preferred embodiment, at least 50% by weight, preferably at least 60% by weight, more preferably at least 70% by weight, advantageously at least 80% by weight and even more advantageously 90% by weight of the monomer (M1) is a mixture of methyl methacrylate with optionally at least one other monomer.

According to a second more preferred embodiment the liquid composition or (meth)acrylic syrup comprises a monomer (M2) between 0.01 and 10 phr by weight relative to the sum of (meth)acrylic monomer (M1) and (meth) acrylic polymer (P1), said (meth)acrylic monomer (M2) comprises at least two (meth)acrylic functions; and advantageously between 0.1 and 5 phr by weight of said (meth) acrylic monomer (M2).

The (meth)acrylic monomer (M2) can be chosen from ethylene glycol dimethacrylate, neopentyl glycol diacrylate, neopentyl glycol dimethacrylate, 1,4-butanediol dimethacrylate, 1,4-butanediol diacrylate, 1,3-butylene glycol diacrylate, 1,3-butylene glycol dimethacrylate or mixtures thereof.

As regards the (meth)acrylic polymer (P1), mention may be made of polyalkyl methacrylates or polyalkyl acrylates. According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.9% by weight of methyl methacrylate and from 0.1% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth) acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.9%, advantageously from 90% to 99.9% and more advantageously from 90% to 99.9% by weight of methyl methacrylate and from 0.1% to 20%, advantageously from 0.1% to 10% and more advantageously from 0.1% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer (P1) should be high, which means greater than 50 000 g/mol and preferably greater than 100 000 g/mol.

The weight-average molecular mass can be measured by size exclusion chromatography (SEC).

The (meth)acrylic polymer is fully soluble in the (meth) acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa·s and 10 000 mPa·s. The viscosity of the syrup can be readily measured with a rheometer or a viscometer. The dynamic viscosity is measured at 25° C.

Advantageously, the liquid (meth)acrylic syrup contains no additional voluntarily added solvent.

With regard to the liquid composition LC1 of the present invention, it comprises a wax compound (W) that is a low melting point wax.

The wax compound (W) can be pure or mixture of wax compounds, as long as the mixture is possessing the melting point as given below.

The melting point of the wax compound (W1) is expressed as congealing point. The melting point is evaluated or measured as congealing point according to ASTM D938. Preferably the congealing point of the wax compound (W) is below 85° C. More preferably the melting point of the wax compound (W1) is below 80° C., still more preferably below 75° C., even still more preferably below 70° C., advantageously below 65° C. and more advantageously below 60° C.

More preferably the congealing point of the wax compound (W) is above 15° C. Still more preferably the congealing point of the wax compound (W) is above 20° C., even still more preferably above 21° C., even still more preferably above 22° C., advantageously above 24° C. and more advantageously above 25° C.

More preferably the congealing point of the wax compound (W) is between 15° C. and 85° C. Still more preferably the congealing point of the wax is between 20° C. and 80° C., even still more preferably between 21° C. and 75° C., even still more preferably between 22° C. and 70° C., advantageously between 24° C. and 65° C. and more advantageously between 25° C. and 60° C.

The density of the wax compound (W) is less than the density of the (meth)acrylic monomer (M1) and (meth) acrylic polymer (P1) together. By the density of the (meth) acrylic monomer (M1) and (meth)acrylic polymer (P1) together, is meant a composition consisting of the (meth) acrylic monomer (M1) and (meth)acrylic polymer (P1). One of the components itself alone, could have a density less than the density of the wax compound (W), however a composition of both components together has a density above the density of the wax compound (W).

More preferably the wax compound (W) has a density below 1.1 g/cm³. More preferably the density of the wax compound (W) is below 1.05 g/cm³, still more preferably below 1.02 g/cm³, even still more preferably below 1.0 g/cm³, advantageously below 0.99 g/cm³ and more advantageously below 0.98 g/cm³.

More preferably the wax compound (W) has a density above 0.7 g/cm³. Still more preferably the density of the wax compound (W) is above 0.72 g/cm³, even still more preferably above 0.75 g/cm³, even still more preferably above 0.78 g/cm³, advantageously above 0.8 g/cm³ and more advantageously above 0.85 g/cm³.

More preferably the density of the wax compound (W) is between 0.7 g/cm³ and 1.1 g/cm³. Still more preferably the density of the wax compound (W) is between 0.72 g/cm³ and 1.05 g/cm³, even still more preferably between 0.75 g/cm³ and 1.02 g/cm³, even still more preferably between 0.78 g/cm³ and 1.0 g/cm³, advantageously between 0.8 g/cm³ and 0.99 g/cm³ and more advantageously between 0.85 g/cm³ and 0.98 g/cm³.

With regard to the wax compound (W), it can be made of natural or synthetic waxes or a mixture of blend of both.

The wax compound (W1) can be made of natural or synthetic waxes or a mixture of blend of both, as long as they have the required congealing point density as defined before.

Useful natural waxes include vegetable waxes, animal waxes and mixtures thereof, and can also be fossil waxes as petroleum waxes or lignite, peat or montan waxes.

Useful synthetic waxes include patricianly synthetic waxes, as fatty acid amides and mixtures thereof, and can also be fully synthetic waxes as polyolefin waxes or Fischer-Tropsch waxes, or polar synthetic waxes.

As the wax compound (W) can be a mixture, the melting point is not a single peak or point, but could also be a range. However, the melting range is below, above or inside the indicated temperatures.

Optionally the liquid composition comprises additionally d) an initiator (Ini).

The quantity of the initiator (Ini) in the composition is at least 0.1 phr relative to the sum of (meth)acrylic monomer (M1) and (meth)acrylic polymer (P1). Preferably the quantity of the initiator (Ini) in the composition is at least 0.2 phr, more preferably at least 0.5 phr, even more preferably at least 0.75 phr and advantageously at least 1 phr relative to the sum of (meth)acrylic monomer (M1) and (meth)acrylic polymer (P1).

The quantity of the initiator (Ini) in the composition is at most 15 phr of relative to the sum of (meth)acrylic monomer (M1) and (meth)acrylic polymer (P1). Preferably the quantity of the initiator (Ini) in the composition is at most 12 phr, more preferably at most 10 phr, even more preferably at most 8 phr and advantageously at most 5 phr relative to the sum of (meth)acrylic monomer (M1) and (meth)acrylic polymer (P1).

The quantity the initiator (Ini) in the composition is between 0.1 phr and 15 phr relative to the sum of (meth) acrylic monomer (M1) and (meth)acrylic polymer (P1). Preferably the quantity the initiator (Ini) in the composition is between 0.2 phr and 12 phr, more preferably between 0.5 phr and 10 phr, even more preferably between 0.75 phr and 8 phr and advantageously at most between 1 phr and 5 phr relative to the sum of (meth)acrylic monomer (M1) and (meth)acrylic polymer (P1).

With regard to the initiator (Ini), the initiator generate radicals that initiate the monomer(s) to start a radical polymerization of the monomer in order to form the polymer chains by propagation.

Preferably the initiator (Ini) is activated by heat.

The heat activated initiator (Ini) is preferably radical initiators.

The radical initiator (Ini) can be chosen from peroxy group comprising compound or azo group comprising compounds and preferably from peroxy group comprising compound or mixtures thereof.

Preferably the peroxy group comprising compound comprises from 2 to 30 carbon atoms.

Preferably the peroxy group comprising compound is chosen from diacyl peroxides, peroxy esters, peroxydicarbonates, dialkyl peroxides, peroxyacetals, hydroperoxide or peroxyketale.

More preferably the initiator (Ini) is chosen from diisobutyryl peroxide, cumyl peroxyneodecanoate, di-(3-methoxybutyl) peroxydicarbonate, 1,1,3,3-Tetramethylbutyl peroxyneodecanoate, cumyl peroxyneoheptanoate, di-n-propyl peroxydicarbonate, tert-amyl peroxyneodecanoate, di-secbutyl peroxydicarbonate, diisopropyl peroxydicarbonate, di(4-tert-butylcyclohexyl) peroxydicarbonate, di-(2-ethylhexyl)-peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide, 3,6,9-triethyl-3,6,9-trimethyl-1,4,7-triperoxonane, 2,2'-azobisisobutyronitrile (AIBN), 2,2'-azodi-(2-methylbutyronitrile), azobisisobutyramide, 2,2'-azobis(2,4-dimethylvaleronitrile), 1,1'-Azodi (hexahydrobenzonitrile), or 4,4'-azobis(4-cyanopentanoic) and mixtures thereof.

In order to conserve a dynamic viscosity of the liquid composition LC1 or (meth)acrylic syrup, also that it allows good impregnation of the fibrous substrate if necessary, and to conserve the thermoplastic properties of the matrix obtained after polymerization of the fibrous substrate preimpregnated with syrup, the compounds of the syrup are incorporated in the following mass percentages:

The (meth)acrylic monomer (M1) or the (meth)acrylic monomer(s) (M1) in the liquid composition LC1 or (meth) acrylic syrup are present in proportions of between 40% and 90% by weight and preferably between 45% and 85% by weight and more preferably between 50% and 85% by weight and still more preferably between 60% and 85% by weight and advantageously between 65% and 85% by weight of the composition comprising (meth)acrylic monomer (M1) or (meth)acrylic monomer(s) (M1) and (meth) acrylic polymer (P1).

The (meth)acrylic polymer (P1) or the (meth)acrylic polymer(s) (P1) in the liquid composition LC1 or (meth) acrylic syrup are present in a proportion of at least 1% by weight, preferably at least 5% and advantageously at least 10% by weight of the composition comprising (meth)acrylic monomer(s) (M1) and (meth)acrylic polymer (P1).

The (meth)acrylic polymer (P1) or the (meth)acrylic polymer(s) (P1) in the liquid composition LC1 or in the liquid (meth)acrylic syrup are present in a proportion of not more than 50% by weight, preferably not more than 40% by weight, still more preferably not more than 35% by weight and advantageously not more than 30% by weight of the composition comprising (meth)acrylic monomer (M1) or (meth)acrylic monomer(s) (M1) and (meth)acrylic polymer (P1).

Preferably (meth)acrylic polymer (P1) the (meth)acrylic polymer(s) (P1) in the liquid composition LC1 or in the liquid (meth)acrylic syrup are present in proportions of between 10% and 60% by weight and preferably between 15% and 55% by weight and more preferably between 15% and 50% by weight and still more preferably between 15% and 40% by weight and advantageously between 15% and 35% by weight of the composition comprising (meth)acrylic monomer (M1) or (meth)acrylic monomer(s) (M1) and (meth)acrylic polymer (P1).

The composition comprising (meth)acrylic monomer (M1) or (meth)acrylic monomer(s) (M1) and (meth)acrylic polymer (P1) is also the liquid mixture prepared in the comprising (meth)acrylic monomer (M1) and (meth)acrylic polymer (P1) prepared the respective processes of the present invention. In the composition comprising (meth)acrylic monomer (M1) or (meth)acrylic monomer(s) (M1) and (meth)acrylic polymer (P1) the two compounds add up to 100 wt %; which can be considered as 100 part by weight and the quantity of the wax compound (W) and other additives are calculated on tis basis.

All the optional additives and fillers are added to the liquid (meth)acrylic syrup before the impregnation and or polymerization.

As regards the process for manufacturing the liquid composition LC1 or (meth)acrylic syrup, a first step consists in preparing a first syrup comprising the (meth)acrylic monomer (M1) or mixture of (meth)acrylic monomers and a (meth)acrylic polymer (P1).

The wax compound (W) is added to the composition prepared in the first step.

If required the initiator (Ini) is then added to the syrup, in the proportions indicated above to conserve a dynamic viscosity of between 10 mPa*s and 10 000 mPa*s, at 25° C.

Preferably the initiator (Ini) is added at a temperature $T_{add}$ below 50° C., more preferably below 40° C., advantageously below 30° C. and more advantageously below 25° C.

The liquid composition according to the invention, detailed in previous paragraphs, can be used for impregnating fibres or fibrous substrate or for manufacturing thermoplastic parts or manufacturing composite parts.

As regards the process for impregnating the fibres or fibrous substrate, it comprises a step of impregnating the fibrous substrate with the liquid composition LC1 or (meth) acrylic syrup.

This impregnation step can take place in a mold or or a bath.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of several fibres, uni directional rovings or continuous filament mat, fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibres. When the fibres are continuous, their assembly forms fabrics.

The one-dimensional form corresponds to linear long fibres. The fibres may be discontinuous or continuous. The fibres may be arranged randomly or parallel to each other, in the form of a continuous filament. A fibre is defined by its aspect ratio, which is the ratio between the length and diameter of the fibre. The fibres used in the present invention are long fibres or continuous fibres. The fibres have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibres, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibres or mixtures thereof, an assembly of the two-dimensional form in the third dimension.

The origins of the fibrous material may be natural or synthetic. As natural material one can mention plant fibres, wood fibres, animal fibres or mineral fibres.

Natural fibres are, for example, sisal, jute, hemp, flax, cotton, coconut fibres, and banana fibres. Animal fibres are, for example, wool or hair.

As synthetic material, mention may be made of polymeric fibres chosen from fibres of thermosetting polymers, of thermoplastic polymers or mixtures thereof.

The polymeric fibres may consist of polyamide (aliphatic or aromatic), polyester, polyvinyl alcohol, polyolefins, poly-urethanes, polyvinyl chloride, polyethylene, unsaturated polyesters, epoxy resins and vinyl esters.

The mineral fibres may also be chosen from glass fibres, especially of E, R or S2 type, carbon fibres, boron fibres or silica fibres.

The fibrous substrate of the present invention is chosen from plant fibres, wood fibres, animal fibres, mineral fibres, synthetic polymeric fibres, glass fibres and carbon fibres, and mixtures thereof.

Preferably, the fibrous substrate is chosen from mineral fibres.

The fibres of the fibrous substrate have a diameter between 0.005 μm and 100 μm, preferably between 1 μm and 50 μm, more preferably between 5 μm and 30 μm and advantageously between 10 μm and 25 μm.

Preferably, the fibres of the fibrous substrate of the present invention are chosen from continuous fibres (meaning that the aspect ratio does not necessarily apply as for long fibres) for the one-dimensional form, or for long or continuous fibres for the two-dimensional or three-dimensional form of the fibrous substrate.

According to another additional aspect, the invention relates to a polymeric composite material comprising a thermoplastic (meth)acrylic matrix and a fibrous substrate used as reinforcement, in which the fibrous substrate consists of long fibres, said composite material being characterized in that the thermoplastic (meth)acrylic matrix is obtained after polymerization of said fibrous substrate pre-impregnated with said liquid composition LC1 according to the invention or (meth)acrylic syrup.

Another aspect of the present invention is a process for manufacturing mechanical or structured parts or products, comprising the following steps:

i) impregnating a fibrous substrate with the liquid composition LC1 or (meth)acrylic syrup according to the invention, ii) polymerizing the liquid composition LC1 or (meth) acrylic syrup impregnating said fibrous substrate.

The polymerization of the liquid composition LC1 or (meth)acrylic syrup that has impregnated the fibrous substrate during the process for manufacturing mechanical or structured parts or products during polymerizing step in all embodiments or aspects of the invention, takes place at temperature between 40° C. and 140° C.

According to another additional aspect, the invention relates to the use of the liquid composition LC1 for manufacturing thermoplastic parts or manufacturing composite parts.

According to another additional aspect, the invention relates to the use of the liquid composition LC1 prepared by the process of the present invention for manufacturing thermoplastic parts or manufacturing composite parts.

According to another additional aspect, the invention relates to a process for manufacturing thermoplastic parts by a process comprising the following steps:

i) preparing a liquid mixture of (meth)acrylic polymer (P1) and (meth)acrylic monomer (M1)

ii) adding a wax compound (W) to the mixture prepared in previous step.

iii) putting the liquid (meth)acrylic composition or liquid composition LC1 prepared in i) and ii) in means for polymerization, said composition is being characterized in that it comprises additionally:

d) a initiator (Ini);

said liquid (meth)acrylic syrup or liquid composition LC1 having a dynamic viscosity of between 10 mPa*s and 10 000 mPa*s at 25° C., according to any of claims 1 to 10, iv) polymerizing According to another additional aspect, the invention relates to a process for manufacturing composite parts by a process comprising the following steps:

i) preparing a mixture of (meth)acrylic polymer (P1), (meth)acrylic monomer (M1) and a wax compound (W)

ii) adding initiator (Ini) to the mixture prepared in previous step.

iii) impregnating fibres or fibrous substrate with the liquid composition or liquid composition LC1 prepared in i) and ii), said composition is being characterized in that it comprises:

a) a (meth)acrylic polymer (P1), b) a (meth)acrylic monomer (M1), c) a wax compound (W) and d) two initiators (Ini1) and (Ini2);

said liquid (meth)acrylic syrup or liquid composition LC1 having a dynamic viscosity of between 10 mPa*s and 10 000 mPa*s at 25° C., iv) polymerizing As regards the process for manufacturing thermoplastic composite parts, according to the six aspect, the process comprises preferably the step of adding an initiator (Ini) to the liquid composition LC1, before putting said liquid composition LC1 in means for polymerization.

As regards the process for manufacturing thermoplastic composite parts or composite parts, but also mechanical or structured parts or products, various processes could be used for preparing these parts. Mention may be made of open molding, pultrusion, hand lay-up and filament winding.

A first preferred manufacturing process for manufacturing composite parts are processes according to which the liquid composition LC1 is transferred to the fibrous substrate by impregnation of the fibrous substrate in an open mold.

A second preferred manufacturing process for manufacturing composite parts are processes according to which the liquid composition is used in pultrusion process. The fibres are guided through a resin batch comprising the composition according to the invention. The fibres as fibrous substrate are for example in form of a unidirectional roving or a continuous filament mat. After impregnation in the resin bath the wetted fibres are pulled through a heated die, where polymerization takes place.

A third preferred manufacturing process is hand lay-up.

A fourth preferred manufacturing process is filament winding.

The process for manufacturing composite parts, but also mechanical or structured parts or products, can additionally comprise the step of post forming. The post forming includes bending as changing the form of the composite part. Preferably the post forming takes place after the polymerizing step.

The process for manufacturing composite parts, but also mechanical or structured parts or products, can additionally comprise the step of welding or gluing or laminating. Preferably the welding or gluing or laminating takes place after the polymerizing step.

The thermoplastic composite parts obtained from the processes according to the invention can be post formed after polymerization of the liquid composition LC1 of the invention. The forming includes bending as changing the form of the composite.

The thermoplastic parts or manufactured composite parts obtained after polymerization of the liquid composition of the invention and/or from the processes according to the invention can be welded, glued or laminated.

According to another additional aspect, the invention relates to a polymeric composite material comprising a thermoplastic (meth)acrylic matrix and a fibrous substrate used as reinforcement, in which the fibrous substrate consists of long fibres, said composite material being characterized in that the thermoplastic (meth)acrylic matrix is obtained after polymerization of the liquid composition LC1, said fibrous substrate has been preimpregnated with the liquid composition LC1.

According to still another additional aspect, the invention relates to a mechanical part or structural element made of said polymeric composite material.

According to still another additional aspect, the invention relates to a mechanical part or structural element made by any manufacturing process of the invention.

As regards the use of the mechanical parts made of composite material thus manufactured, mention may be made of automotive applications, transport applications such as buses or lorries, nautical applications, railroad applications, sport, aeronautic and aerospace applications, photovoltaic applications, computer-related applications, construction and building applications, telecommunication applications and wind energy applications.

The mechanical part made of composite material is especially a motor vehicle part, boat part, bus part, train part, sport article, plane or helicopter part, space ship or rocket part, photovoltaic module part, a material for construction or building for example composite rebars, dowels and stirrups for civil engineering and high rise construction, wind turbine part for example spar cap of girder of wind turbine blade, furniture part, construction or building part, telephone or cellphone part, computer or television part, or printer or photocopier part.

[Methods]

The density (having the unity g/cm$^3$) of a compound is simply calculated by measuring the mass and the volume of the compound estimating and then dividing the mass by the volume. Preferably the density is measured with a pycnometer and still more preferably at 25° C.

The congealing point is measured according to ASTM D938.

Examples

A liquid composition is prepared by dissolving 25% by weight of the PMMA (BS520, a copolymer of MMA comprising ethyl acrylate as comonomer) as (P1) in 75% by weight of methyl methacrylate as (M1), which is stabilized with HQME (hydroquinone monomethyl ether). As wax compound (W) Feruwax 13015 form the company PARAMELT BV is used. The wax has a congealing point according to ASTM D938 of 52° C.-54° C. The wax compound is dispersed at different ratios from 0.3 phr to 1 phr in the liquid composition in order to prepare several liquid compositions LC1 according to the invention as shown in table 1. The dynamic viscosity of the compositions is 500 mPa*s at 25° C.

TABLE 1

| compositions | |
|---|---|
| | Wax compound (W) in liquid composition LC1 [phr] |
| Comparative example 1 = CoEX1 | 0 |
| Example 1 = EX1 | 0.3 |
| Example 2 = EX2 | 0.5 |
| Example 3 = EX3 | 0.7 |
| Example 4 = EX4 | 1.0 |

The respective compositions are applied at a known quantity at a before weighted fabric and exposed to air at 23° C. The weight of the two together is measured every two minutes.

The loss of weight of methyl methacrylate (MMA) is followed gravimetrically at 23° C.

TABLE 2

| Evaluation of the evaporation of MMA | | | | |
|---|---|---|---|---|
| | weight loss / [%] at 23° C. | | | |
| time / [min] | CoEX1 | EX1 | EX2 | EX3 | EX4 |
| 2 | 5.2 | 5.1 | 1.9 | 0.2 | 0.0 |
| 4 | 9.8 | 6.2 | 2.1 | 0.5 | 0.2 |
| 6 | 14.8 | 6.5 | 2.7 | 0.5 | 0.2 |
| 8 | 17.2 | 6.9 | 3.0 | 0.5 | 0.4 |
| 10 | 18.1 | 7.0 | 3.1 | 0.4 | 0.3 |
| 12 | 18.7 | 7.1 | 3.1 | 0.5 | 0.5 |
| 14 | 19.5 | 7.2 | 3.1 | 0.4 | 0.4 |
| 16 | 20.1 | 7.2 | 3.3 | 0.5 | 0.5 |
| 18 | 20.8 | 7.2 | 3.4 | 0.6 | 0.6 |
| 20 | 21.2 | 7.3 | 3.5 | 0.6 | 0.6 |

Table 2 shows a decrease of evaporated MMA with time for the examples with presence of wax compound. The evaporation is strongly reduced when using 0.3 phr of wax compound, very low when using 0.5 phr or more of wax compound with nearly no evaporation when using 0.7 phr and 1 phr of wax compound.

The invention claimed is:

1. A liquid composition LC1 comprising,
   a) a (meth)acrylic polymer (P1) having a weight-average molecular mass greater than 100,000 g/mol and comprising at least 90% by weight of methyl methacrylate,
   b) a (meth)acrylic monomer (M1), wherein at least 80% by weight of the (meth)acrylic monomer (M1) is methyl methacrylate, and
   c) between 0.45 phr and 1.4 phr relative to the sum of (meth)acrylic monomer (M1) and (meth)acrylic polymer (P1) of a wax compound (W) having a congealing point below 60° C.,
   said liquid composition having a dynamic viscosity of between 25 mPa*s and 10,000 mPa*s at 25° C.,
   wherein the (meth)acrylic polymer (P1) is present in a proportion not more than 30% by weight relative to the total weight of (meth)acrylic monomer (M1) and (meth)acrylic polymer (P1), and
   wherein less than 5 wt % of the (meth)acrylic monomer (M1) evaporates at 23° C. for a duration of 20 minutes.

2. The liquid composition LC1 as claimed in claim 1, wherein the quantity of the wax compound (W) in the composition is between 0.5 phr and 1.3 phr relative to the sum of (meth)acrylic monomer (M1) and (meth)acrylic polymer (P1).

3. The liquid composition LC1 according to claim 1, wherein the density of the wax compound (W) is less than the density of the (meth)acrylic monomer (M1) and (meth) acrylic polymer (P1) together.

4. The liquid composition LC1 according to claim 1, wherein the density of the wax compound (W) is less than 1.1 g/cm³.

5. The liquid composition LC1 according to claim 1, wherein the density of the wax compound (W) is between 0.7 g/cm³ and 1.1 g/cm³.

6. The liquid composition LC1 according to claim 1, wherein the liquid composition comprises additionally d) an initiator (Ini).

7. The liquid composition LC1 according to claim 6, wherein quantity the initiator (Ini) in the composition is between 0.75 phr and 8 phr relative to the sum of (meth) acrylic monomer (M1) and (meth)acrylic polymer (P1).

8. The liquid composition LC1 according to claim 6, wherein the initiator (Ini) is chosen from diisobutyryl peroxide, cumyl peroxyneodecanoate, di(3-methoxybutyl) peroxydicarbonate, 1,1,3,3-Tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethyl-hexyl)-peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethyl-butyl peroxy-2-ethylhexanoate, tert-amyl peroxy-2-ethyl-hexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimeth-ylcyclohexane, 1,1-di(tert-amylperoxy) cyclohexane, 1,1-di-(tert-butylperoxy)-cyclohexane, tert-amyl peroxy-2-eth-ylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-di-methyl-2,5-di-(tert-butylperoxy)-hexane, tert-butylcumyl peroxide, 2,5-dimethyl-2,5-di(tert-butylperoxy) hexyne-3, di-tert-butyl peroxide, 3,6,9-triethyl-3,6,9-trimethyl-1,4,7-triperoxonane, 2,2'-azobisisobutyronitrile (AIBN), 2,2'-azodi-(2-methylbutyronitrile), azobisisobutyramide, 2,2'-azobis (2,4-dimethylvaleronitrile), 1,1'-Azodi (hexahydrobenzonitrile), or 4,4'-azobis (4-cyanopentanoic) and mixtures thereof.

9. The liquid composition LC1 according to claim 1, wherein the wax compound (W) has a congealing point is between 15° C. and 60° C.

10. The liquid composition LC1 according to claim 1, wherein the liquid composition LC1 comprises a monomer (M2) between 0.01 and 10 phr by weight relative to the sum of (meth)acrylic monomer (M1) and (meth)acrylic polymer (P1), said (meth)acrylic monomer (M2) comprises at least two (meth)acrylic functions.

11. The liquid composition LC1 according to claim 1, wherein the (meth)acrylic monomer(s) (M1) in the liquid composition LC1 or (meth)acrylic syrup are present in proportions of between 40% and 90% by weight of the composition comprising (meth)acrylic monomer(s) (M1) and (meth)acrylic polymer (P1).

12. Process for preparing the liquid composition LC1 according to claim 1, said process comprising the following steps:
   i) preparing a mixture of (meth)acrylic polymer (P1) and (meth)acrylic monomer (M1);
   ii) adding a wax compound (W) to the mixture prepared in previous step.

13. The process according to claim 12, wherein the (meth)acrylic polymer (P1) in the liquid composition LC1 or (meth)acrylic syrup is present in proportions of between 15% and 35% by weight and the (meth)acrylic monomer (M1) in the liquid composition LC1 or (meth)acrylic syrup is present in proportions of between 65% and 85% by weight of the composition comprising (meth)acrylic monomer (M1) and (meth)acrylic polymer (P1).

14. The process according to claim 12, wherein an initiator (Ini) is added to the the liquid composition LC1.

15. The process according to claim 12, wherein the in that the wax compound (W) has a congealing point is between 25° C. and 60° C.

16. Process for manufacturing thermoplastic parts by a process comprising the following steps:
   i) preparing a liquid mixture of (meth)acrylic polymer (P1) and (meth)acrylic monomer (M1)
   ii) adding a wax compound (W) to the mixture prepared in previous step,
   iii) putting the liquid (meth)acrylic composition prepared in i) and ii) in means for polymerization, said composition comprises additionally:
      d) a initiator (Ini);
      said liquid (meth)acrylic syrup having a dynamic viscosity of between 10 mPa*s and 10 000 mPa*s at 25° C., according to claim 1,
   iv) polymerizing.

17. The process according to claim 16 made by open molding, pultrusion, hand lay-up and filament winding.

18. The process according to claim 16, wherein the polymerizing step takes place at temperature between 40° C. and 140° C.

19. The process according to claim 16, wherein the process further comprises a step of post forming.

20. The process according to claim 16, wherein the process further comprises a step of welding or gluing or laminating.

21. A polymeric composite material comprising a thermoplastic (meth)acrylic matrix and a fibrous substrate used as reinforcement, in which the fibrous substrate consists of long fibres having an aspect ratio of at least 1000, said composite material being wherein the thermoplastic (meth) acrylic matrix is obtained after polymerization of the liquid composition LC1, said fibrous substrate preimpregnated with the liquid composition LC as claimed in claim 1.

22. A mechanical part or structural element made of composite material as claimed in claim 21.

23. The part as claimed in claim 22, said part being a motor vehicle part, boat part, train part, sport article, plane or helicopter part, space ship or rocket part, photovoltaic module part, a material for construction or building, dowels and stirrups for civil engineering and high rise construction, wind turbine part for example spar cap of girder of wind turbine blade, furniture part, construction or building part, telephone or cellphone part, computer or television part, printer or photocopier part.

\* \* \* \* \*